United States Patent Office 2,858,187
Patented Oct. 28, 1958

2,858,187

URANIUM RECOVERY

Frederick T. Fitch, Ottawa, and Alexander J. Cruikshank, Chalk River, Canada, assignors, by mesne assignments, to the United States of America as represented by the United States Atomic Energy Commission No Drawing. Application August 13, 1948
Serial No. 44,228

6 Claims. (Cl. 23—14.5)

This invention relates to the recovery of uranium from a solution of an organic compound in an organic solvent substantially immiscible with water.

It has previously been proposed that uranium might be separated from thorium and protoactinium in aqueous nitrate solutions containing relatively very small amounts of uranium, by adding to the nitrate solution an organic salt such as diethyldithiocarbamate which results in the production of an organic compound of uranium which may be extracted into an organic solvent immiscible with water. The organic compound produced in this way is one of the probable formula

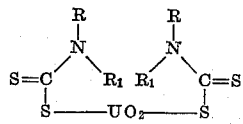

in which R is alkyl, e. g. methyl, ethyl or butyl, and $R_1$ is alkyl or aryl, e. g. phenyl.

The process of the present invention provides a way of recovering such uranium compounds from their solutions in organic solvents, although it may be applied to cases in which other organic compounds of uranium are dissolved in organic solvents substantially immiscible with water.

According to the invention a solution of an organic compound of uranium in an organic solvent substantially immiscible with water is brought into intimate contact with an aqueous solution of an alkali metal carbonate or ammonium carbonate, with the result that the uranium passes to the carbonate solution as a uranyl carbonate. The uranium may be easily recovered from the carbonate solution. Such carbonates as sodium and ammonium carbonate are suitable, but ammonium carbonate is preferred because the uranium may be most easily recovered from solution therein by boiling away the carbon dioxide and water and a part of the ammonia, and thus precipitataing the uranium as ammonium diuranate. The extraction with the carbonate solution can, if desired, be repeated. The concentration of the carbonate solution is not important, though it is found preferable to use a more concentrated solution and fewer extractions. Examples of organic solvents substantially immiscible with water in which the organic compound of uranium may be dissolved are amyl acetate, diethyl ketone, methyl isobutyl ketone, methyl N-propyl ketone, dibutoxytetraethylene glycol, or carbon tetrachloride.

The process is preferably carried out by stirring an organic solvent containing the uranium compound with $\frac{1}{10}$ volume of 10% ammounium carbonate. The stirring is continued vigorously for 3–5 minutes, and the layers are then separated. Two extractions of this kind with a final water wash of the organic solvent will generally recover practically all the uranium.

In the application of the process to the recovery of uranium from a solution in methyl isobutyl ketone of a complex uranyl salt formed with diethyldithiocarbamate as a result of treatment according to the prior proposal referred to, it was found possible with one extraction, using 10% ammonium carbonate, to reduce the uranium concentration in the methyl isobutyl ketone from $61\gamma/\text{ml}$. to substantially less than $1\gamma/\text{ml}$. ($1\gamma = \frac{1}{1,000,000}$ gr.).

What we claim as our invention is:

1. The process of recovering uranium from a solution of a dithiocarbamate of uranium in an organic solvent substantially immiscible with water, which comprises bringing said solution into intimate contact with an aqueous solution of ammonium carbonate, whereby the uranium passes to the carbonate solution as a uranyl carbonate.

2. The process of recovering uranium from a solution of an organic compound thereof of the formula

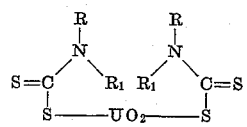

in which R is alkyl and $R_1$ is alkyl or aryl in an organic solvent substantially immiscible with water, which comprises bringing said solution into intimate contact with an aqueous solution of ammonium carbonate, whereby the uranium passes to the carbonate solution as a uranyl carbonate.

3. The process according to claim 1, and recovering uranium from the uranyl carbonate solution by precipitating it as ammonium diuranate.

4. The process of recovering uranium from a solution of a dithiocarbamate of uranium in an organic solvent substantially immiscible with water, which comprises stirring said solution wth one-tenth volume of ten percent ammonium carbonate, and separating the layers that are formed.

5. The process according to claim 4, and boiling away the carbon dioxide, water and a part of the ammonia, thus precipitating uranium as ammonium diuranate.

6. The process of recovering uranium from a solution of a diethyldithiocarbamate thereof in an organic solvent, substantially immiscible with water, which comprises bringing said solution into intimate contact with an aqueous solution of ammonum carbonate, whereby the uranium passes to the carbonate solution as a uranyl carbonate.

References Cited in the file of this patent

UNITED STATES PATENTS 2,227,833    Hixson et al. _____ Jan. 7, 1933

OTHER REFERENCES

Friend: Textbook of Inorganic Chemistry, vol. 7, part 3, page 334 (1926), publ. by Charles Griffin & Co., Ltd., London.